(12) United States Patent
Kato

(10) Patent No.: US 6,598,863 B2
(45) Date of Patent: Jul. 29, 2003

(54) FLUID FILLED CYLINDRICAL ELASTIC MOUNT HAVING INTERMEDIATE SLEEVE EXHIBITING IMPROVED DEFORMATION RESISTANCE AND METHOD OF PRODUCING THE SAME

(75) Inventor: Kazuhiko Kato, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/755,562

(22) Filed: Jan. 5, 2001

(65) Prior Publication Data
US 2001/0017436 A1 Aug. 30, 2001

(30) Foreign Application Priority Data
Jan. 21, 2000 (JP) ........................................ 2000-012515

(51) Int. Cl.$^7$ ................................................. F16F 5/00
(52) U.S. Cl. .............................. 267/140.12; 267/141.2; 267/219
(58) Field of Search ...................... 267/140.11, 140.12, 267/140.13, 141.1, 141.2, 141, 219, 141.3, 141.4, 141.5; 248/562, 636

(56) References Cited

U.S. PATENT DOCUMENTS

| | | | |
|---|---|---|---|
| 4,702,346 A | 10/1987 | Uno et al. | 181/207 |
| 4,705,410 A | 11/1987 | von Broock | 267/141.2 |
| 5,098,072 A * | 3/1992 | Muramatsu et al. | 267/140.1 |
| 5,213,313 A | 5/1993 | Tsutsumida et al. | 267/140.12 |
| 5,333,847 A | 8/1994 | Kanda | 267/140.12 |
| 5,558,316 A * | 9/1996 | Lee et al. | 267/140.12 |
| 6,068,247 A * | 5/2000 | Rudolph | 267/140.12 |

FOREIGN PATENT DOCUMENTS

| | | |
|---|---|---|
| EP | 0 368 352 A | 5/1990 |
| JP | 05 065933 A | 3/1993 |
| JP | 10-153233 | 6/1998 |
| JP | 10 153233 A | 6/1998 |

* cited by examiner

Primary Examiner—Jack Lavinder
Assistant Examiner—Thomas J. Williams
(74) Attorney, Agent, or Firm—Rossi & Associates (57) ABSTRACT

A fluid-filled cylindrical elastic mount having an inner sleeve and an outer sleeve, and an elastic body interposed therebetween. The elastic mount also has a intermediate sleeve having a plurality of windows through which a plurality of pockets formed at respective circumferential positions of the elastic body are open in the outer circumferential surface of the intermediate sleeve, respectively. The plurality of windows are fluid-tightly closed by the outer sleeve, thereby defining a plurality of fluid chambers filled with a non-compressible fluid. The elastic mount further includes an orifice member for defining an orifice passage for fluid communication between the plurality of fluid chambers. The orifice member disposed in at lest one of the plurality of windows such that the orifice member circumferentially extends over the entire circumferential length of said at least one window, and that the orifice member has its axial length which varies in its circumferential direction such that the orifice member is held in abutting contact with the axially opposite edges of said at least one window in the circumferentially intermediate portion of the window, while being axially spaced apart from the axially opposite edges of the window in at least circumferentially opposite end portions of the window, so as to provide opening through which the corresponding pocket is open in the outer circumferential surface of the intermediate sleeve. The method of producing the mount is also disclosed.

12 Claims, 5 Drawing Sheets

FLUID FILLED CYLINDRICAL ELASTIC MOUNT HAVING INTERMEDIATE SLEEVE EXHIBITING IMPROVED DEFORMATION RESISTANCE AND METHOD OF PRODUCING THE SAME

This application is based on Japanese Patent Application No. 2000-12515 filed Jan. 21, 2000, the contents of which are hereby incorporated by reference.

BACKGROUND OF THE INVENTION

1. Field of the Invention

The present invention relates in general to a fluid-filled cylindrical elastic mount which provides a desired vibration damping or isolating effect, utilizing flow of a fluid contained therein, and more particularly to such a cylindrical elastic mount which is easy to manufacture, and which prevents undesirable deformation of components upon assembling these components, thereby exhibiting high stability in quality and improved vibration damping and isolating characteristics of the mount. The present invention is also relates to method of producing the cylindrical elastic mount.

2. Description of the Related Art

A cylindrical elastic mount is known as a vibration damper interposed between two member of a vibration system, to flexibly connecting two members or flexibly mounting one of the two members on the other member. As disclosed in JP-A-10-153233, for example, the cylindrical elastic mount includes a center shaft member and an intermediate metal sleeve member which are disposed in coaxial or eccentric relation with each other, with a suitable radial spacing therebetween, and are connected to each other by an elastic body interposed between the two members. The elastic body has a plurality of pockets formed at respective circumferential portions thereof, which pockets are open in an outer circumferential surface of the intermediate metal sleeve through a plurality of windows formed through the intermediate metal sleeve, respectively. The elastic mount further includes an outer sleeve member which is fitted on the intermediate sleeve so as to close the plurality of windows and which cooperates with the plurality of pockets to define a plurality of fluid chambers filled with a non-compressible fluid, and an orifice member to define orifice passages through which the plurality of chambers communicate with each other. The fluid-filled cylindrical elastic mount as described above utilizes an effect of flow of the fluid, more specifically, the resonance of the fluid flowing through the orifice passage, so as to exhibit a high vibration damping or isolating effect with respect to a vibrational load receiving in directions perpendicular to an axis of the shaft member. This type of elastic mount has been favorably used as an engine mount for a motor vehicle, for example.

The outer sleeve member is fitted on the intermediate metal sleeve by a suitable method. For instance, the outer sleeve member is disposed radially outwardly of the intermediate metal sleeve with a slight radial spacing therebetween. The outer sleeve member is radially inwardly compressed so as to reduce its diameter by effecting a suitable drawing operation which is performed by using eight drawing dies disposed around the outer sleeve member. Thus, the outer sleeve member is fixedly fitted on the outer circumferential surface of the intermediate metal sleeve, thereby closing the openings of the pockets. Alternatively, the outer sleeve member is fitted on the intermediate metal sleeve by a press-fitting operation to press-fit the intermediate metal sleeve in the bore of the outer sleeve member, thereby closing the openings of the pockets. The press-fitting operation permits a rapid and easy assembling of the outer and intermediate sleeve members in comparison with the drawing operation. Further the press-fitting operation may be usable upon assembling an illegally shaped outer sleeve member, such as an outer sleeve including a bracket portion formed as an integral part thereof, with the intermediate metal sleeve.

However, the conventionally employed press-fitting operation, may suffer from inherent problems. Namely, the intermediate metal sleeve member is subjected to resistance force and frictional force applied thereto in its axial direction, upon press-fitting the intermediate metal sleeve member in the bore of the outer sleeve member. This may possibly causes undesirable deformation of the intermediate metal sleeve, especially in circumferential portions where the plurality of windows are formed, since the provision of the windows leads to reduction in a substantial axial dimension and mechanical strength of the intermediate metal sleeve member. The undesirable deformation of the intermediate sleeve not only effects adversely on spring characteristics of the elastic body member, but also possibly causes insufficient fluid-tight sealing between the intermediate and outer sleeve members and a resultant leakage of the fluid from the mount. The conventional elastic mount suffers from a problem of a relatively high ratio of rejects, due to this undesirable deformation of the intermediate metallic sleeve member.

SUMMARY OF THE INVENTION

It is therefore an object of the present invention to provide a fluid-filled cylindrical elastic mount which is novel in construction and which is capable of preventing undesirable deformation of an intermediate sleeve member, upon press-fitting the intermediate sleeve member in an outer sleeve member, so that the desired elastic mount can be produced with high stability and ease.

It is another object of the invention to provide a method of producing such a fluid-filled cylindrical elastic mount as described just above.

The first object may be achieved according to the following modes of the invention each of which is numbered like the appended claims and depends from the other mode or modes, where appropriate, to indicate possible combinations of elements or technical features of the invention. It is to be understood that the present invention is not limited to those modes of the invention and combinations of the technical features, but may otherwise be recognized based on the thought of the present invention that disclosed in the whole specification and drawings or that may be recognized by those skilled in the art in the light of the disclosure in the whole specification and drawings.

(1) A fluid filled cylindrical elastic mount including: (a) a center shaft member; (b) an intermediate sleeve member disposed radially outwardly of the center shaft member, the intermediate sleeve member having a plurality of windows formed therethrough, and having a circumferential groove formed in an axially intermediate portion thereof and being open in an outer circumferential surface thereof; (c) an elastic body interposed between the center shaft member and the intermediate sleeve member and having a plurality of pockets formed at respective circumferential positions thereof, the plurality of pockets being open in an outer circumferential surface of the intermediate sleeve member through the plurality of windows, respectively; (d) an outer sleeve member fitted on the intermediate sleeve member so as to close the plurality of windows and cooperating with the plurality of pockets to define a plurality of fluid chambers which are filled with a non-compressible fluid; and (e) an orifice member for defining an orifice passage for fluid communication between the plurality of fluid chambers, the orifice member being disposed in at least one of the plurality of windows so as to extend over an entire circumferential length of the at least one window, and being supported by the intermediate sleeve member such that circumferential opposite end portions of the orifice member are fitted in the circumferential groove on the sides of circumferentially opposite edges of the at least one window, respectively, while having an orifice groove which is formed and open in an outer circumferential surface of said orifice member that is fluid-tightly closed by the outer sleeve member to thereby provide the orifice passage. The orifice member has an axial length which varies in the circumferential direction thereof such that the orifice member is held in abutting contact with axially opposite edges of said at least one of the plurality of windows in a circumferentially intermediate portion of the at least one window, and that the orifice member is spaced apart from at least one of the axially opposite edges of said at least one window in the axial direction thereof in at least one of circumferentially opposite end portions of said at least one window so as to provide opening through which the corresponding pocket is open in the outer circumferential surface of the intermediate sleeve member.

In the fluid-filled cylindrical elastic mount according to the above mode (1) of the present invention, the center shaft member and the intermediate sleeve member are elastically connected to each other by the elastic body which is interposed between and bonded by vulcanization to these two members. The thus obtained intermediate integral vulcanized product is assembled with the orifice member. The intermediate integral vulcanized product with the orifice member mounted is then press-fitted in the bore of the outer sleeve member, so that the outer sleeve member is fitted on the intermediate sleeve member.

According to the above mode (1) of the present invention, the axially opposite edges of the at least one window formed through the intermediate sleeve member are connected with each other in the axial direction of the intermediate sleeve member via the orifice member interposed therebetween. In this arrangement, the mechanical strength of the intermediate sleeve member is sufficiently increased at its circumferential portion where the window is formed, so that the intermediate sleeve member can exhibit sufficient deformation resistance with respect to a load applied thereto in the axial direction thereof. Thus, the intermediate sleeve member of the present elastic mount is less likely to suffer from or is free from a problem of deformation thereof due to the axial load applied thereto when the intermediate sleeve member is press-fitted in the outer sleeve member, so that the present elastic mount can exhibit desired spring characteristics and fluid-tight sealing at the interfaces of the components with high stability. Besides, the intermediate sleeve member of the present elastic mount may facilitate operation for press-fitting the intermediate integral vulcanized product in the bore of the outer sleeve member, resulting in improved efficiency of manufacture of the desired fluid-filled cylindrical elastic mount.

In the intermediate integral vulcanized product on which the orifice member is mounted, the pocket over which the orifice member is disposed is open in the outer circumferential surface of the intermediate sleeve member through the opening formed in at least one of the circumferential opposite end portions of the at least one window. This arrangement facilitates removal of the air from the pocket filled with the non-compressible fluid, resulting in improved efficiency of manufacture of the mount, and improved stability of damping characteristics of the mount.

Preferably, the plurality of fluid chambers includes two fluid chambers which are disposed in the respective circumferential positions that are opposed to each other in a diametric direction of the mount in which a primary vibrational load is applied. The two fluid chambers are communicated with each other through the orifice passage.

(2) A fluid-filled cylindrical elastic mount according to the above-indicated mode (1), wherein the orifice member is held in abutting contact with the axially opposite edges of the at least one of the plurality of windows via a sealing rubber layer interposed therebetween.

In the above mode (2), the orifice member can be easily fitted in the window of the intermediate sleeve member, owing to elastic deformation of the sealing rubber layer interposed between the orifice member and the axially opposite edges of the window, facilitating operation for assembling the orifice member in the intermediate sleeve member. Further, the sealing rubber layer is compressed by and between the axially opposite end faces of the orifice member and the axially opposite edges of the window, whereby the orifice member and the intermediate sleeve member are closely or firmly connected with each other in the circumferential position where the window is formed. Thus, the intermediate sleeve member is reinforced with the orifice member at its circumferential position where the window is formed. Preferably, the sealing rubber layer may be formed on and bonded to the orifice member and/or the intermediate sleeve member. When the sealing rubber layer is formed on the intermediate sleeve member, for example, the sealing rubber layer is integrally formable with the elastic body by simultaneous vulcanization of the elastic body and the sealing rubber layer.

(3) A fluid-filled cylindrical elastic mount according to the above-indicated mode (1) or (2), the at least one of the plurality of windows over which the orifice member extends, has a circumferential length which is not smaller than one-third of the circumference of the intermediate sleeve member.

In the above mode (3), the circumferential length of the window is made larger enough to provide the corresponding fluid chamber with a sufficiently large volume, while the mechanical strength of the intermediate sleeve member is sufficiently reinforced by the orifice member disposed in the window. This arrangement permits a sufficient amount of flow of the fluid flowing through the orifice passage, upon application of a vibrational load to the elastic mount, resulting in improved vibration damping or isolating effect based on the resonance of the flow of the fluid flowing through the orifice passage.

(4) A fluid-filled cylindrical elastic mount according to any one of the above-indicated modes (1)–(3), wherein the plurality of fluid chambers includes a pressure receiving chamber partially defined by the elastic body and being adapted to undergo pressure changes upon application of a vibrational load to the mount, and an equilibrium chamber being diametrically opposite to the pressure receiving chamber and partially defined by a flexible diaphragm, said equilibrium chamber having a volume which is variable due to deformation of the flexible diaphragm. The orifice member is disposed in at least the window through which the pressure-receiving chamber is open in outer circumferential surface of said intermediate sleeve member.

In the above mode (4), the orifice member assembled within the elastic mount such that the orifice member extend along with the inner circumferential surface of the circumferential portion of the outer sleeve member, which circumferential portion partially defines the pressure receiving chamber. The orifice member thus assembled is capable of effectively reinforcing the circumferential portion of the outer sleeve member where the pressure-receiving chamber is partially defined. In this mode, the orifice member is not necessarily required to be disposed on the side of the equilibrium chamber. The absence of the orifice member on the side of the equilibrium chamber permits sufficient amount of volumetric change of the equilibrium chamber, effectively.

(5) A fluid-filled cylindrical elastic mount according to any one of the above-indicated modes (1)–(4), wherein the orifice member is an arquate plate member which extends in a circumferential direction of the intermediate sleeve member and has a pair of axial protrusions formed in a circumferentially intermediate portion thereof so as to protrude outwardly from axially opposite end faces thereof, in axially opposite directions, the pair of axial protrusions having an protruding end faces which are held in abutting contact with circumferentially intermediate portions of said axially opposite edges of the at least one window, respectively, and the orifice member being spaced apart from the axially opposite edges of the at least one window in the axial direction thereof in circumferentially opposite end portions of the at least one window, to thereby provide at each of said circumferentially opposite end portions of the at least one window, two openings which are spaced apart from each other in the axial direction of the orifice member with the orifice member interposed therebetween, through which openings the corresponding pocket being open in the outer circumferential surface of the intermediate sleeve member.

In the fluid-filled elastic mount according to the above mode (5), the axial protrusions of the orifice member is held in abutting contact at their protruding end faces with the axially opposite edges of the at least one window at the circumferentially intermediate portions of the window, resulting in excellent reinforcement of the intermediate sleeve member with the orifice member. The provision of the openings in the circumferentially opposite end portions of the window permits easy introduction of the non-compressible fluid within the pocket through the openings and easy removal of the air undesirably remained within the pocket through the openings, upon filling the pocket with the non-compressible fluid, resulting in improved efficiency of operation for introducing and filling the non-compressible fluid within the pockets.

(6) A fluid-filled cylindrical elastic mount according any one of the above-indicated modes (1)–(5), wherein the orifice member includes a stop portion formed as an integral part thereof, the stop portion extending from an inner surface of the orifice member into the fluid chamber through a central portion of one of said plurality of windows formed through the intermediate sleeve member, so as to opposed to the center shaft member in the diametric direction with a predetermined amount of radial spacing therebetween.

In the above mode (6), the orifice member that has a sufficient strength with respect to the input vibrational load, is effectively utilized to form a stopper mechanism for limiting the amount of relative displacement of the center shaft member and the outer sleeve member in the diametric direction, that is in the load-receiving direction. Further, the orifice member which constitutes the stop portion is directly supported by the outer sleeve member, making it possible that the stop portion exhibits sufficiently large strength resistive to a relatively large load applied thereto.

The second object indicated above may be achieved according to the following mode of the present invention:

(7) A method of producing a fluid-filled cylindrical elastic mount defined in any one of the above-indicated modes (1)–(6), comprising the steps of: assembling the orifice member in an intermediate integral vulcanized product in which the shaft member and the intermediate sleeve member being elastically connected with each other by the elastic body interposed therebetween; and press-fitting the intermediate integral vulcanized product in a bore of said outer sleeve member within a mass of a non-compressible fluid.

According to the method of the above mode (7), the filling of the fluid chambers with the non-compressible fluid can be conducted at the same time when the intermediate integral vulcanized product assembled with the orifice member is press-fitted in the bore of the outer sleeve member. It is appreciated that the outer sleeve member thus fitted on the intermediate integral vulcanized product need not be subjected to a suitable drawing operation, which is performed, for example, by using eight drawing dies disposed around the outer sleeve member. This leads to reduction in number of the manufacturing steps, resulting in improved efficiency of manufacture of the elastic mount.

It is also appreciated that the air remained within the pockets filled with the non-compressible can be easily and steadily removed from the openings formed in at least one of the opposite circumferential end portions of the at least one window of the intermediate sleeve member, and that the presence of the circumferential portion of the orifice member which is interposed between and connected with opposite axial edges of the at least one window, is effective to prevent undesirable deformation of the intermediate sleeve member, in the above-indicated press-fitting operation, permitting manufacture of the desired product with high stability in quality thereof and with ease. Preferably, the intermediate integral vulcanized product is rotated or inclined within the mass of the non-compressible fluid, before executing the press-fitting operation, facilitating elimination or removal of the air remained in the plurality of pockets through the openings.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
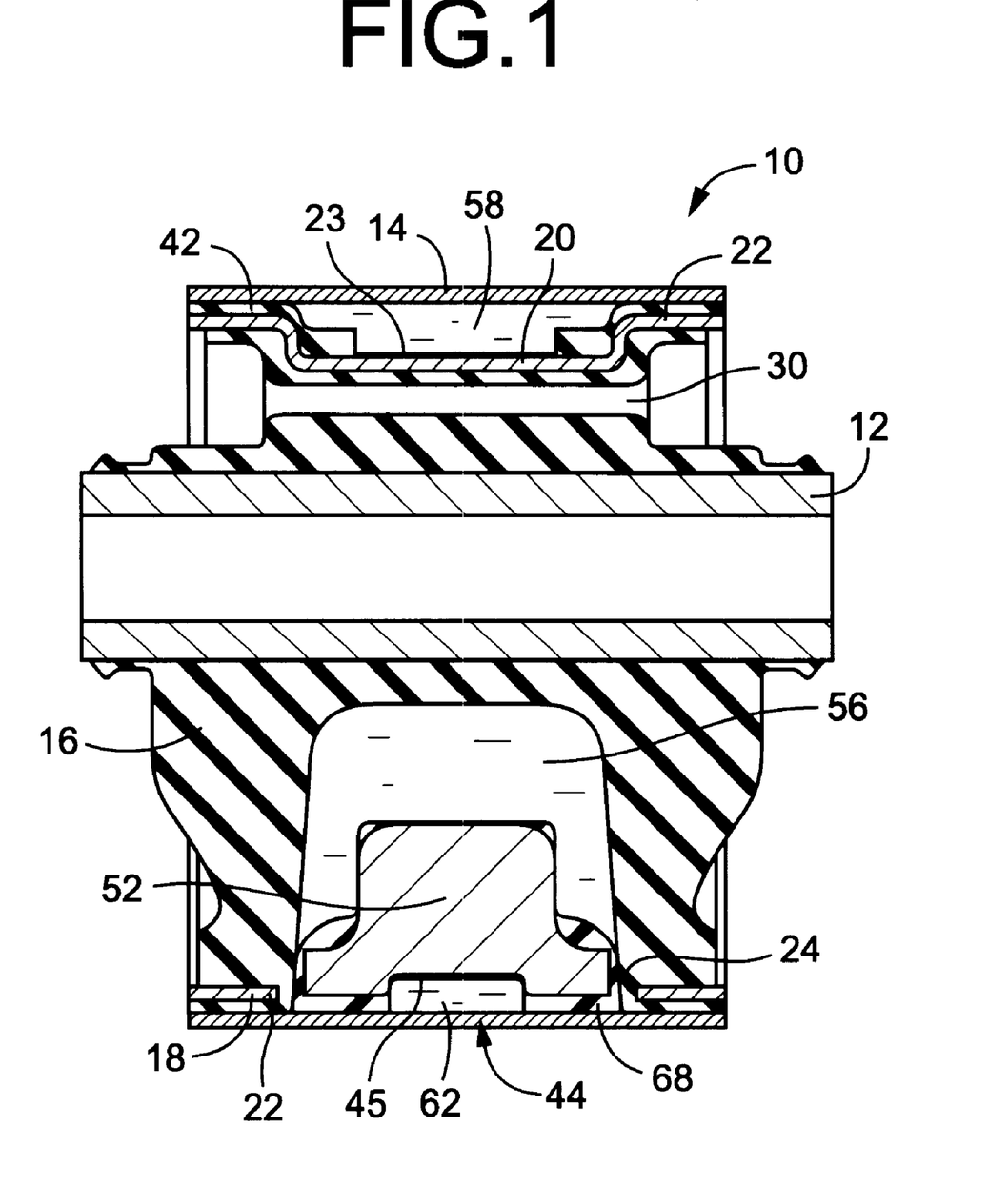
FIG. 1 is an elevational view in longitudinal or axial cross section of an engine mount constructed according to one embodiment of the invention, taken along line 1—1 of FIG. 2.
Figure 2:
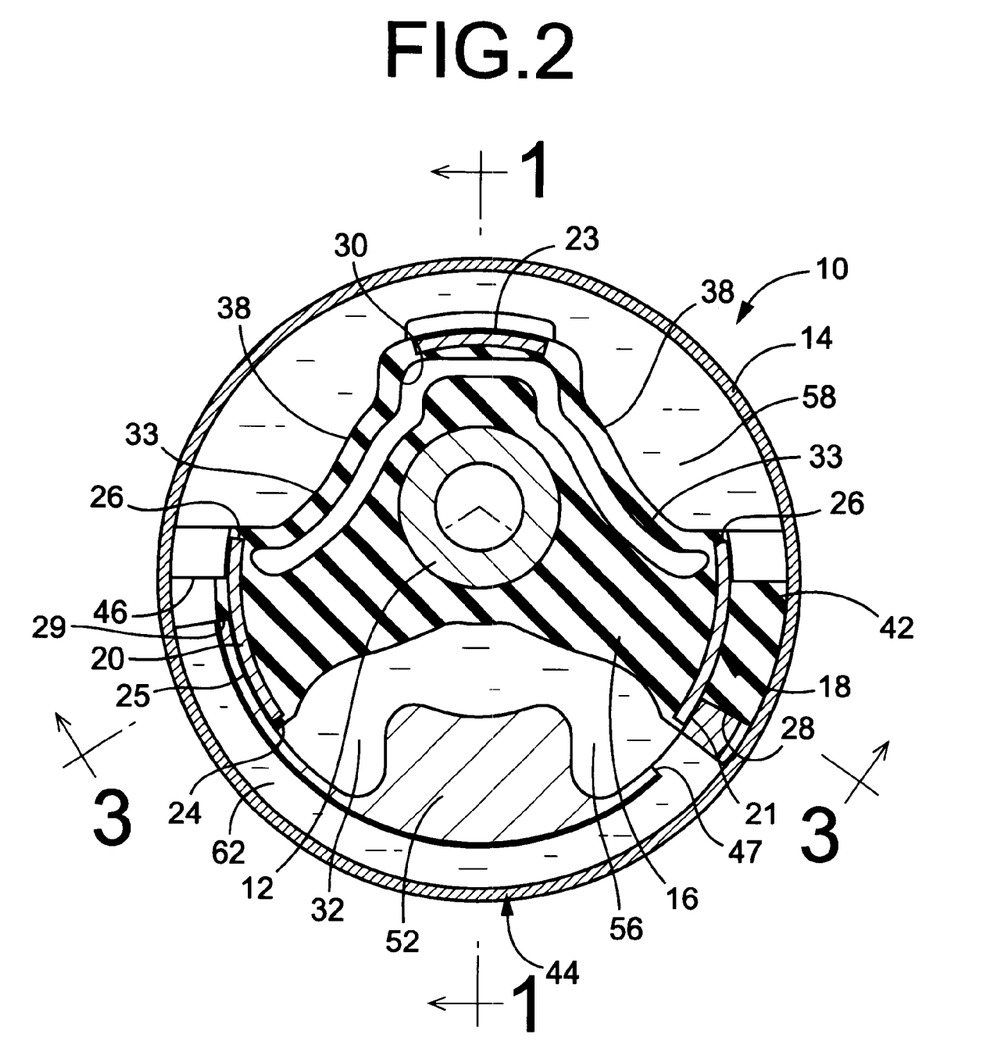
FIG. 2 is an elevational view in transverse cross section of the engine mount of FIG. 1.
Figure 3:
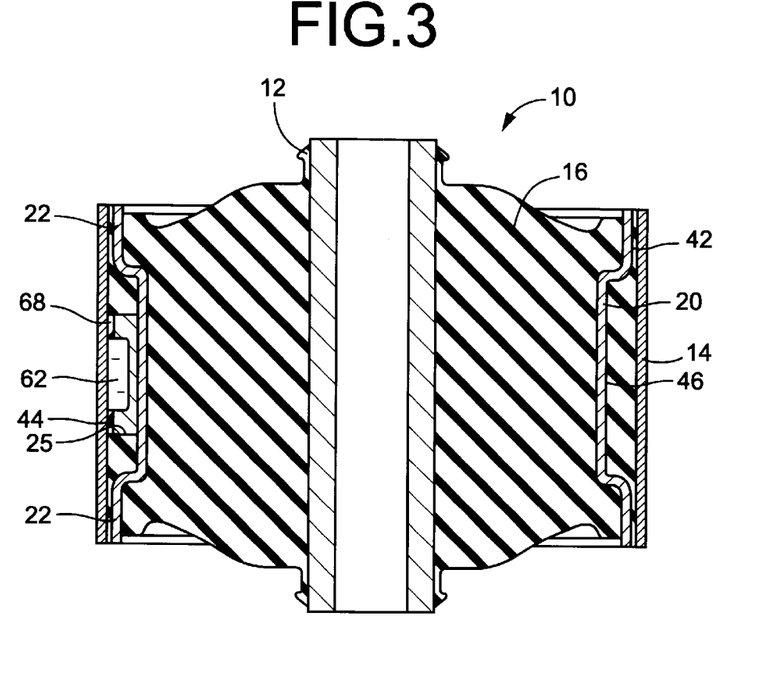
FIG. 3 is a cross sectional view taken along line 3—3 of FIG. 2.
Figure 4:
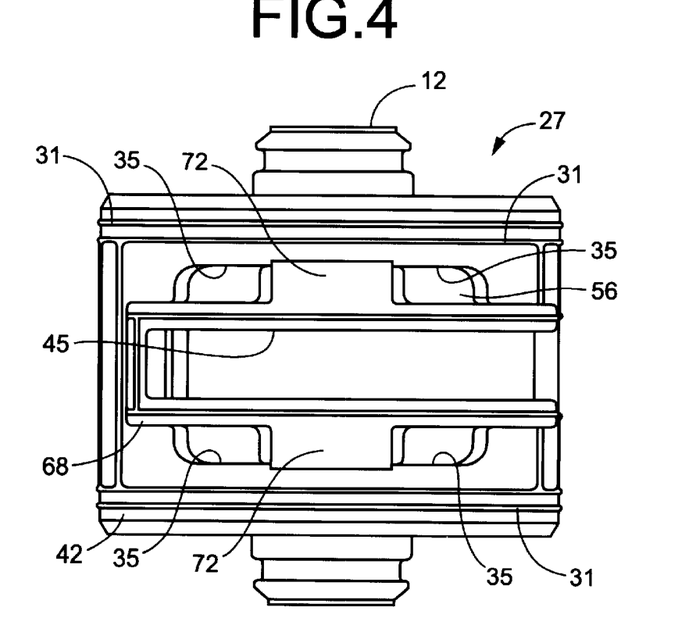
FIG. 4 is a bottom plane view showing an orifice member of the engine mount of FIG. 1 and an integral vulcanized product in which the orifice member is fixedly assembled.
Figure 5:
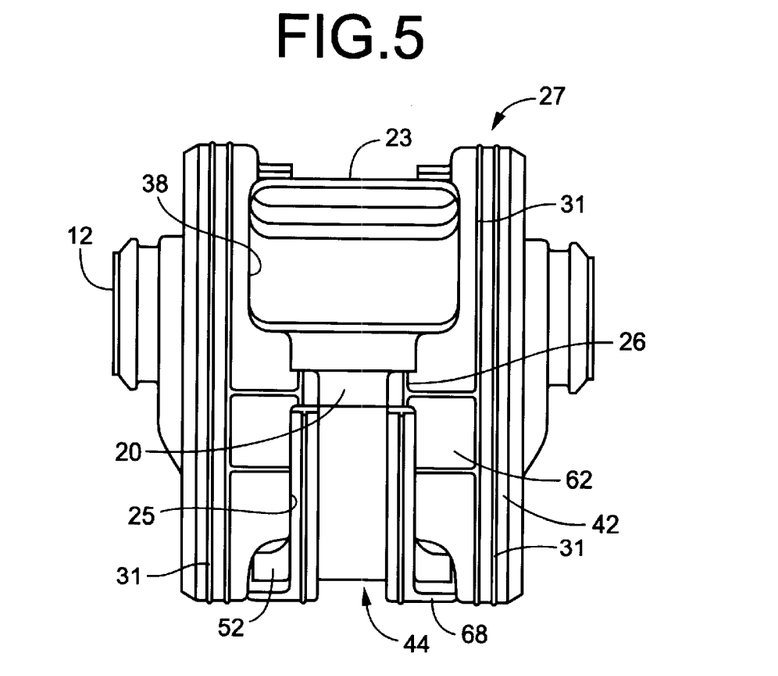
FIG. 5 is a plane view showing the orifice member assembled in the integrally vulcanized product, as viewed from the right-hand side of FIG. 4.
Figure 6:
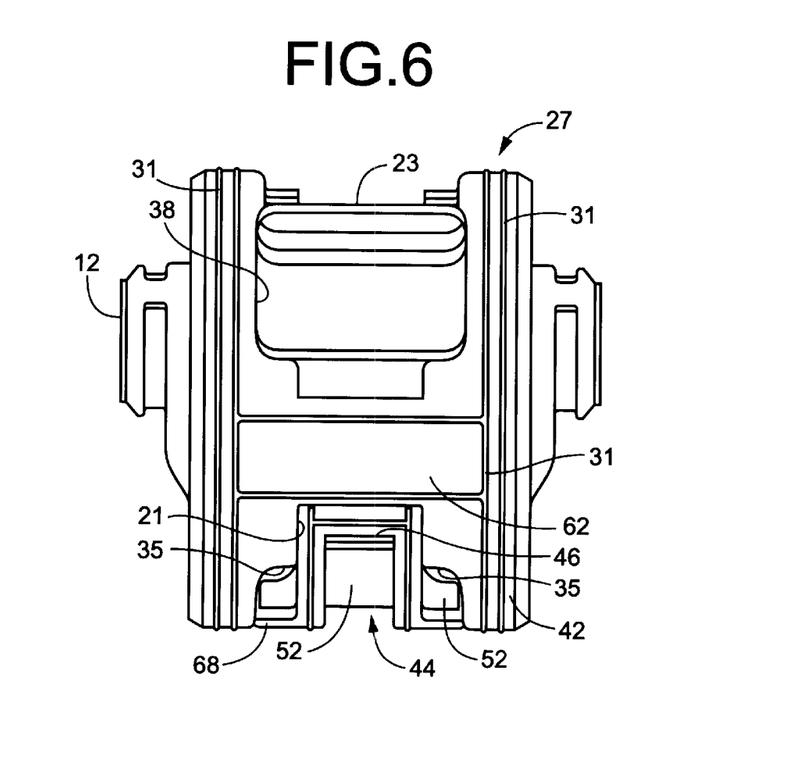
FIG. 6 is a plane view showing the orifice member assembled in the integrally vulcanized product, as viewed from the left-hand side of FIG. 4.
Figure 7:
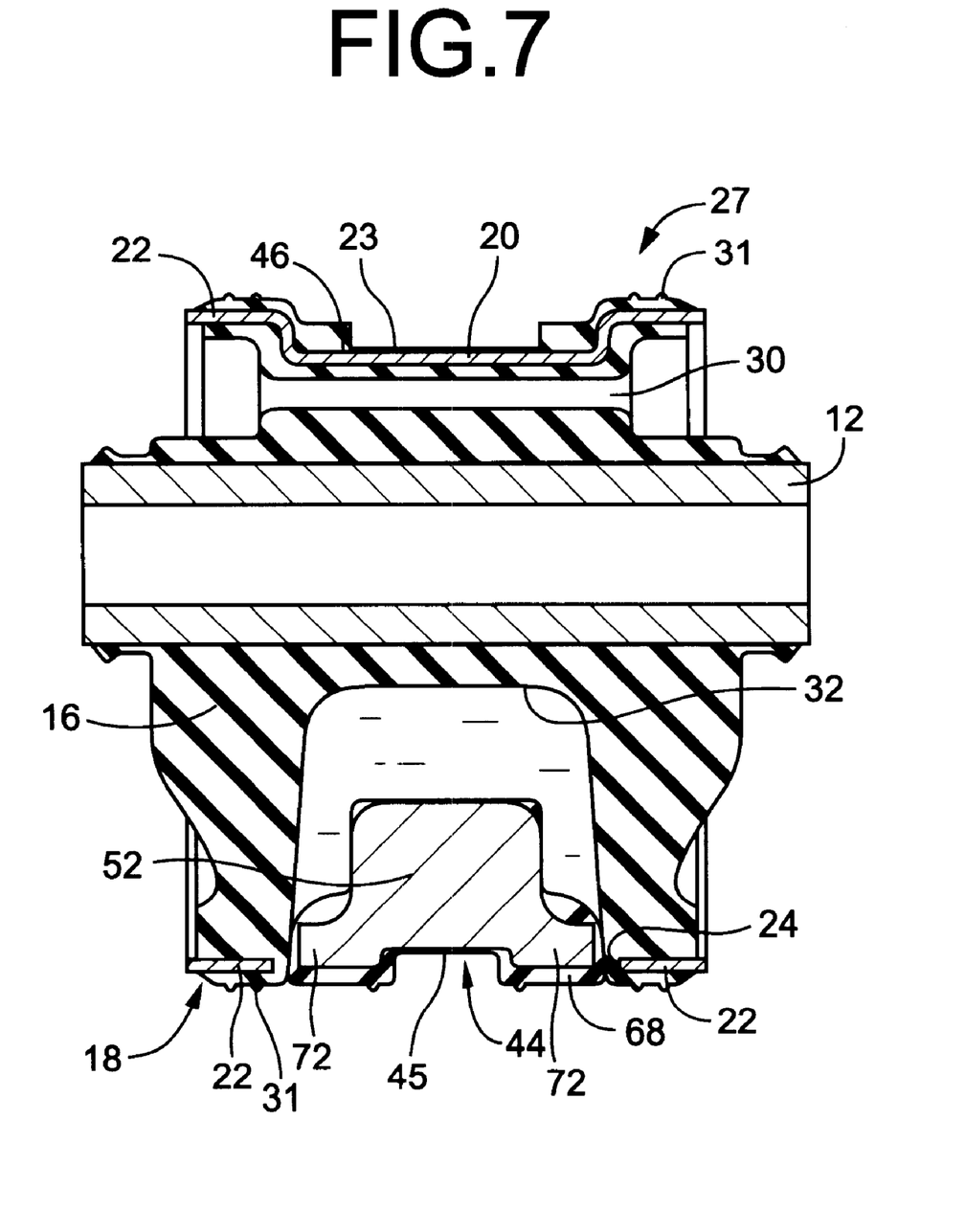
FIG. 7 is an elevational view in longitudinal or axial cross section of the orifice member assembled in the integrally vulcanized product as shown in FIG. 4.

Referring first to FIGS. 1–3, there is shown one embodiment of the present invention in the form of an engine mount 10 for an automotive vehicle. The engine mount 10 includes an inner sleeve 12 as a shaft member and an outer sleeve 14, both of which are made of metal. These inner and outer sleeves 12, 14 are disposed in eccentric relation by a slight radial distance with each other, with a suitable radial spacing therebetween, and are connected to each other by an elastic body 16 interposed therebetween. The engine mount 10 as described above is installed on the automotive vehicle such that the inner sleeve 12 is fixed to one of the power unit and the vehicle body while the outer sleeve 14 is fixed to the other, thereby mounting a power unit of the vehicle including its engine upon the vehicle body in a vibration damping or isolating manner. With the weight of the power unit acting on the engine mount 10, the elastic body 16 is elastically deformed so that the inner and outer sleeves 12, 14 are placed in a substantially coaxial or concentric relation with each other. The present engine mount 10 is constructed and oriented on the motor vehicle such that a vibrational load acts on the inner and outer sleeves 12, 14 primary in a diametric direction of the engine mount 10 in which the inner and outer sleeves 12, 14 are initially offset from each other before installation of the engine mount 10 on the vehicle.

Described in detail, the inner sleeve 12 is a cylindrical member having a comparatively small diameter. An intermediate sleeve 18 made of metal and having a comparatively large diameter is disposed radially outwardly of the inner sleeve 12 such that the intermediate sleeve 18 is radially offset from the inner sleeve 12 by a slight radial distance, like the outer sleeve 14. The intermediate sleeve 18 has a small-diameter portion 20 at its axially intermediate portion and large-diameter portions 22, 22 at its axially opposite end portions. That is, the intermediate sleeve 18 is a stepped cylindrical member and the small-diameter portion 20 defines a circumferential groove 46 which extend in the circumferential direction of the intermediate sleeve 18 with a relatively large width.

The intermediate sleeve 18 has a first window 24 and a pair of second windows 26, 26, which are formed through the cylindrical wall of the sleeve 18 with a circumferential spacing therebetween. The first window 24 has a circumferential length which is slightly smaller than a half of the circumference of the intermediate sleeve 18, while the pair of second windows 26, 26 have an circumferential length which is slightly smaller than a quarter of the circumference of the intermediate sleeve 18. The first window 24 is located in a lower one of two diametrically opposite circumferential portions of the engine mount 10 at which the radial distance between the inner sleeve 12 and the intermediate sleeve 18 is larger in the offset direction of the inner and intermediate sleeves 12, 18 of FIG. 2, while the pair of second windows 26, 26 are located in an upper one of the two diametrically opposite circumferential portions at which the radial distance between the inner and intermediate sleeves 12, 18 is smaller in the offset direction. That is, the first window 24 and the pair of second windows 26, 26 are opposed to each other in a diametric direction of the inner sleeve 12. The first and second windows 24, 26, 26 are formed with the axial length which is larger than that of the small diameter portion 20, so that the intermediate sleeve 18 is formed solely by the axially spaced large-diameter portions 22, 22 at the respective circumferential positions thereof where these windows 24, 26, 26 are formed.

The elastic body 16 is a generally cylindrical rubber member having a relative large wall thickness, and is bonded at its inner circumferential surface to the inner sleeve 12 and at its outer circumferential surface to the intermediate sleeve 18 by vulcanization of a rubber material to form the elastic body 16. The elastic body 16 has an axial void 30 formed in circumferential portions thereof at which the radial distance between the inner and intermediate sleeves 12, 18 is shorter. That is, the void 30 is formed in the upper one of the two circumferential portions which are diametrically opposed to each other in the offset direction or in the vertical direction as seen in FIGS. 1 and 2. The void 30 extends through the elastic body 16 over the entire axial length, while extending in the circumferential direction with a circumferential length substantially equal to a half of the entire circumference of the elastic body 16. In the presence of the axial void 30, the elastic body 16 is divided into a lower circumferential part which is bonded to the inner sleeve 12 and an upper circumferential part which is not bonded to the inner sleeve 12. In this arrangement, the inner sleeve 12 is substantially elastically connected with the intermediate sleeve 18 by only the lower circumferential part of the elastic body 16 which is located in the lower circumferential portion of the engine mount 10, at which the radial distance between the two sleeves 12, 18 is larger.

The elastic body 16 has a first pocket 32 formed in its lower circumferential part which is located in the lower circumferential portion of the engine mount 10 where the radial distance between the inner and intermediate sleeves 12, 18 is larger, and a pair of second pockets 38, 38 formed in its upper circumferential part which is located in the upper circumferential portion of the engine mount 10 where the radial distance between the inner and intermediate sleeves 12, 18 is smaller. The second pockets 38, 38 are spaced apart from each other in the circumferential direction. The first pocket 32 has a circumferential length of about one-third (⅓) of the outer circumference of the elastic body 16, and open in the outer circumferential surface of the intermediate sleeve 18 through the first window 24. On the other hand, the second pockets 38, 38 have a circumferential length of about one-fifth (⅕) of the outer circumference of the elastic body 16, and open in the outer circumferential surface of the intermediate sleeve 18 through the second windows 26, 26, respectively. The provision of the axial void 30 provides the bottom walls of the pair of second pockets 38, 38 which have a relatively small wall thickness and are easily elastically deformable. That is, the bottom walls of the pair of second pockets 38, 38 provides flexible diaphragm 33 which is easily deformable.

The elastic body 16 of the present embodiment extends outwardly through the first and second windows 24, 26, 26 of the intermediate sleeve 18 so as to provide a relatively thin sealing rubber layer 42 which is formed over substantially the entire area of the outer circumferential surface of the large-diameter portions 22, 22 of the intermediate sleeve 18, with a substantially constant thickness. The sealing rubber layer is bonded to the outer surfaces of the large-diameter portions 22, 22 by simultaneous vulcanization of the elastic body 16 and the sealing rubber layer 42. The sealing rubber layer 42 has sealing lips 31 as integral parts thereof, which protrude slightly outwardly from the outer circumferential surface of the sealing rubber layer 42. The sealing lips 31 consists of: lips formed on both sides of the side of the axially opposite ends of the intermediate sleeve 18 so as to extend circumferential direction of the intermediate sleeve 18, and lips formed on the both sides of the circumferentially opposite ends of the first window 24 so as to extend in the axial direction of the intermediate sleeve 18.

The sealing rubber layer 42 further formed over the outer circumferential surface of the small diameter portion 20, such that a first circumferential portion of the circumferential groove 46 located on the side of one of the circumferentially opposite ends of the first window 24, i.e., the light hand end of the first window 24 as seen in FIG. 2, is filled with the sealing rubber layer 42 and is substantially closed by the sealing rubber layer 42. The first circumferential portion of the circumferential groove 46 filled with the sealing rubber layer 42 is formed with a fixing groove 21 extending from the right hand end of the window 24 by a slight circumferential length. A second circumferential portion of the groove 46 located on the side of the other circumferential end of the window 24, i.e., the left hand end of the first window 24 as seen in FIG. 2, is formed with a fixing groove 25 extending circumferentially between the first and second windows 24, 26. A third circumferential portion of the groove 46 located between the second windows 26, 26 is formed with a communication groove 23 extending in the circumferential direction with a relatively large width. The communication groove 23 permits a fluid communication between the second windows 26, 26 therethrough.

Then, an orifice member 44 is mounted on the outer circumferential surface of the intermediate integral vulcanized product 27 constructed as described above. The orifice member 44 is a generally semi-cylindrical member made of rigid materials such as aluminum alloy, and extending in the circumferential direction of the intermediate sleeve 18 with a circumferential length which is slightly smaller than a half of the circumference of the intermediate sleeve 18, with an axial length which is smaller than that of the small diameter portion 20, and with the radius of curvature substantially equal to that of the small diameter portion 20. The orifice member 44 is mounted on the outer circumferential surface of the intermediate sleeve 18, such that the orifice member 44 extends over the first window 24 in the circumferential direction. The circumferentially opposite end portions of the orifice member 44 is fitted in the fixing grooves 21, 25 both formed in the small diameter portion 20 of the intermediate sleeve 18, so that the orifice member 44 is fixedly assembled in and supported by the small diameter portion 20 of the intermediate sleeve 18. In the present embodiment, the sealing rubber layer 42 formed in the first and second circumferential portion of the groove 46 further utilized to define a pair of stepped portions 28, 29 as shown in FIG. 2. The circumferential end faces of the orifice member 44 is held in abutting contact with the respective stepped portions 28, 29, so that the orifice member 44 is suitably positioned relative to the intermediate sleeve 18 in the circumferential direction of the intermediate sleeve 18.

The orifice member 44 has an orifice groove 45 formed in its outer circumferential surface so as to extend straightly between its circumferentially opposite ends or edges thereof, and to be open in its outer circumferential surface. The orifice groove 45 communicates at its one end with the first pocket 32 through a communication hole 47 formed through its bottom surface, and at its other end with the second pockets 38, 38 through the fixing groove 25 formed in the outer circumferential surface of the intermediate sleeve 18. The orifice member 44 further has a stop portion integrally formed at a circumferentially intermediate portion of the inner circumferential surface thereof, so as to protrude radially inwardly from the inner circumferential surface thereof, such that the stop portion 52 projects into the interior of the first pocket 32 through the first window 24 of the intermediate sleeve 18. The protruding end face of the stop portion 52 is diametrically opposed to the inner sleeve 12. When the elastic body 16 is excessively elastically deformed, the protruding end face of the stop portion 52 is brought into abutting contact with the inner sleeve 12 via the bottom surface of the first pocket 32 defined by the elastic body 16. That is, the amount of relative displacement of the inner sleeve 12 and the outer sleeve 14 in the load receiving direction is restricted by abutting contact of the stop portion 52 via the elastic body 16 with the inner sleeve 12.

In addition, the orifice member 44 has a pair of axial protrusions 72, 72 integrally formed at its circumferential intermediate portion so as to protrude from its axially opposite end faces in the opposite axial directions, respectively. Each of the axial protrusions 72, 72 has a circumferential length which is sufficiently smaller than that of the first pocket 32, e.g., a circumferential length of about one-third (⅓) of the circumferential length of the first pocket 32, in the present embodiment. An axial length of each axial protrusion 72 is suitably determined so that an axial length between the protruding end faces of the axial protrusions 72, 72 is made slightly smaller than an axial length of the first window 24. A thin sealing rubber layer 68 is formed over and bonded by vulcanization to the substantially entire area of the outer circumferential surface of the orifice member 44, except an area where the orifice groove 45 is formed. The sealing rubber layer 68 has sealing lips 31 which are formed on and protrude from the outer surface of the layer 68, so as to surround the opening of the orifice groove 45.

With the orifice member 44 being assembled in the intermediate integral vulcanized product 27 as described above, the protruding end faces of the axial protrusions 72, 72 is substantially held in abutting contact with the axially opposite edges of the first window 24 of the intermediate sleeve 18. In the present embodiment, particularly, these protrusions 72, 72 abut on the respective axial edges of the first window 24, via the sealing rubber layer 42 formed on the inner circumferential surface of the first window 24 and the sealing rubber layer 68 formed on the outer surface of the orifice member 44. In this condition, the orifice member 44 is fitted at its axial protrusions 72, 72 in the first window 24 formed through the intermediate sleeve 18, so that the large-diameter portion 22 of the intermediate sleeve 18, which are partially spaced apart from each other in the axial direction due to the presence of the first window 24, are directly connected with each other in the axial direction via the orifice member 44. According to this arrangement, the axial load applied to one of the two large-diameter portions 22, 22 is transmitted to the other via the orifice member 44.

The orifice member 44 has another axial length that is made smaller than that of the first window 24 at its circumferentially opposite end portions where the axial protrusions 72, 72 are not formed. In this arrangement, the orifice member 44 is spaced apart from the axially opposite edges of the first window 24 in the axial direction at its circumferentially opposite end portions, thereby providing four pocket openings 35, 35, 35, 35 located at four corners of the first window 24. Thus, the first pocket 32 is open in the outer circumferential surface of the integral vulcanized product 27, through the four pocket openings 35.

As clearly shown in FIGS. 1–3, the outer sleeve 14 is disposed radially outwardly and press-fitted on the intermediate sleeve 18 of the integral vulcanized product 27 which is assembled with the orifice member 44 as described above. The outer sleeve 14 fitted on the intermediate sleeve 18 fluid tightly closes the openings of the first window 24, thereby providing a pressure receiving chamber 56 which undergoes pressure changes due to elastic deformation of the elastic body 16, upon application of vibrations between the inner and outer sleeves 12, 14 in the diametric direction. The outer sleeve 14 also fluid-tightly closes the pair of second windows 26, 26 and the fixing groove 21. The second pocket 38 closed by the outer sleeve 14 provides an equilibrium chamber 58 whose volume is variable due to elastic deformation of the flexible diaphragm 33. These pressure receiving and equilibrium chambers 56, 58 are filled with a non-compressible fluid preferably selected from water, alkylene glycol, polyalkylene glycol, silicone oil and others. The filling of the pressure receiving and equilibrium chambers 56, 58 with the non-compressible fluid may be accomplished by assembling the outer sleeve 14 with the integral vulcanized product 27 assembled with the orifice member 44 within a mass of the fluid.

In the present embodiment, the outer sleeve 14 is mounted on the integral vulcanized product 27 by press-fitting the integral vulcanized product 27 into the bore of the outer sleeve 14. Described in detail, the outer sleeve 14 is arranged to have an inside diameter which is slightly larger than the outer diameter of the intermediate sleeve 18 while being slightly smaller than the outer diameter of the sealing rubber layer 42 bonded to the outer circumferential surface of the intermediate sleeve 18. The intermediate integral vulcanized product 27 is forcedly pushed or press-fitted in the bore of the thus prepared outer sleeve 14, so that the outer sleeve 14 is press-fitted on the outer circumferential surface of the integral vulcanized product 27 with the sealing rubber layer 42 compressed therebetween.

With the opening of the orifice groove 45 closed by the outer sleeve 14, the orifice groove 45 provides an orifice passage 62 for fluid communication between the pressure receiving chamber 56 and the equilibrium chamber 58. The length and cross sectional area of the orifice passage 62 is suitably determined taken into account the density of the fluid, spring stiffness of the walls of the pressure receiving and equilibrium chambers or the like, so that the engine mount 10 exhibits a high vibration damping or isolating effect with respect to desired frequency vibrations such as engine idling, based on resonance of the fluid flowing through the orifice passage 62.

With the thus constructed engine mount 10 installed in position as described above, the vibrational load is applied between the inner and outer sleeves 12, 14, so that the non-compressible fluid is forced to flow through the orifice passage 62 between the pressure receiving and equilibrium chambers 56, 58, whereby the engine mount 10 can exhibit the desired vibration damping or isolating effect.

In the present engine mount 10, the orifice member 44 is fitted at its axial protrusions 72, 72 in the first window 24 in the axial direction, as described above. While the mechanical strength of the intermediate sleeve 18 is insufficient at the circumferential portion where the first window 24 is formed therethrough, the provision of the axial protrusions 72, 72 interposed between and held in abutting contact with the axially opposite edges of the first window 24, is effective to increase the strength of the intermediate sleeve 18. In particular, the intermediate sleeve 18 can exhibits sufficient mechanical strength or deformation resistance with respect to a load applied in the axial direction of the intermediate sleeve 18. In this arrangement, the intermediate sleeve 18 can be press-fitted in the bore of the outer sleeve 14 with a comparatively large pressing force, with a sufficiently large fitting area, and with improved efficiency of the press-fitting operation. Therefore, the outer sleeve 14 can be fixedly fitted on the outer circumferential surface of the integral vulcanized product 27, without undesirable deformation of the intermediate sleeve 18, thereby effectively producing the engine mount 10 which exhibits desired vibration damping characteristics with high stability and excellent fluid-tight sealing between the outer sleeve 14 and the intermediate sleeve 18.

In addition, with the orifice member 44 mounted on the intermediate integral vulcanized product 27 as described above, the first pocket 32 is not completely closed by the orifice member 44, but is open in the outer circumferential surface of the intermediate sleeve 18 through the pocket openings 35 partially defined by the four corner of the first window 24, respectively. This arrangement facilitates the filling of the pressure receiving chamber 56 and equilibrium chamber 58 with the non-compressible fluid, resulting in excellent efficiency of manufacture of the engine mount 10. In addition, the presence of the pocket openings 35 eliminates a problem of undesirable remaining of the air in the pressure receiving and/or equilibrium chambers 56, 58 both filled with the non-compressible fluid, so that the engine mount 10 can exhibit desired vibration damping effect with high stability.

While the present invention has been described in its presently preferred embodiment, for illustrative purpose only, it is to be understood that the invention is not limited to the details of the illustrated embodiment, but may be otherwise embodied.

For instance, the orifice member 44 is fitted in the first window 24 of the intermediate sleeve 18 and is connected or held in abutting contact at its axial protrusions 72, 72 with the large-diameter portions 22 of the intermediate sleeve 18 in order to increase the mechanical strength of the intermediate sleeve 18 with respect to the load in the axial direction. The orifice member 44 may optionally be disposed in the second windows 26, 26, instead of or in addition to the first window 24.

While the engine mount 10 of the illustrated embodiment includes the equilibrium chamber 58, the principle of the present invention is equally applicable to a fluid-filled cylindrical vibration-damping mount which includes a plurality of pressure receiving chambers adapted to receive the vibrational load. In this case, an orifice member constructed according to the present invention is disposed in the opening of at least one of the pressure receiving chambers, so that the mount can exhibits the same effect as mentioned above with respect to the engine mount 10 of the present embodiment.

The configuration and structure of the orifice passage formed in the orifice member 44 is not particularly limited to the illustrated embodiment, but may be suitably determined depending upon required vibration damping or isolating characteristics of the elastic mount.

In the illustrated embodiment, the equilibrium chamber 58 is constituted by the pair of the second pocket 38, 38 which are spaced apart from each other in the circumferential direction, and which is open in the outer circumferential surface of the intermediate sleeve 18 through the pair of second windows 26, 26, respectively. It may be possible to provide the equilibrium chamber which is defined by a single pocket and which is open through a single window formed in the intermediate sleeve 18.

The configuration and structure of the orifice member is not particularly limited to the illustrated embodiment in which the orifice member 44 is held in abutting contact with the axially opposite edges of the first window 24 at the one circumferential position thereof. For instance, the orifice member may be arranged to be held in abutting contact with the axially opposite edges of the window at a plurality of circumferential positions thereof, or alternatively be arranged to be held in abutting contact with one of axially opposite edges of the window. The pocket openings may possibly be formed in the circumferentially intermediate portion of the orifice member 44.

While the engine mount 10 of the automotive vehicle has been illustrated above as one embodiment of the present invention, the principle of the present invention is also equally applicable to various types of fluid-filled cylindrical elastic mount such as differential mounts and body mounts for motor vehicles, and fluid-filled dampers used in devices and equipment other than the motor vehicles, so that these elastic mounts can equally enjoy the effects of the present invention.

It is to be understood that the present invention may be embodied with various other changes, modifications and improvements which may occur to those skilled in the art, without departing from the spirit and scope oft he invention defined by the following claims:

What is claimed is:

1. A fluid filled cylindrical elastic mount comprising:
   a center shaft member;
   an intermediate sleeve member disposed radially outwardly of said center shaft member, said intermediate sleeve member having a plurality of cutouts formed therethrough, and having a circumferential groove formed in an axially intermediate portion thereof and being open in an outer circumferential surface thereof;
   an elastic body interpose between said center shaft member and said intermediate sleeve member and having a plurality of pockets formed at respective circumferential posit ions thereof, said plurality of pockets being open in an outer circumferential surface of said intermediate sleeve member through said plurality of cutouts, respectively;
   an outer sleeve member fitted on said intermediate sleeve member so as to close said plurality of cutouts and cooperating with said plurality of pockets to define a plurality of fluid chambers which are filled with non-compressible fluid; and
   an orifice member for defining an orifice passage for fluid communication between said plurality of fluid chambers, said orifice member being disposed in at least one of said plurality of cutouts so as to extend over an entire circumferential length of said at least one cutout, and being supported by said intermediate sleeve member such that circumferential opposite end portions of said orifice member are fitted in said circumferential groove on the sides of circumferentially opposite edges of said at least one cutout, respectively, while having an orifice groove which is formed and open in an outer circumferential surface of said orifice member, which is fluid-tightly closed by said outer sleeve member to thereby provide said orifice passage,
   said orifice member having an axial length which varies in the circumferential direction thereof such that said orifice member is held in abutting contact with axially opposite edges of said at least one cutout in a circumferentially intermediate portion of said at least one cutout, and that said orifice member is spaced apart from at least one of said axially opposite edges of said at least one cutout in said axial direction thereof in at least one of circumferentially opposite end portions of said at least one cutout so as to provide an opening through which a corresponding pocket is open in said outer circumferential surface of said intermediate sleeve member.

2. A fluid-filled cylindrical elastic mount according to claim 1, wherein said plurality of fluid chambers comprises two fluid chambers which are disposed in said respective circumferential positions that are opposed to each other in a diametric direction of said mount in which a primary vibrational load is applied, said two fluid chambers being communicated with each other through said orifice passage.

3. A fluid-filled cylindrical elastic mount according to claim 1, wherein said orifice member is held in abutting contact with said axially opposite edges of said at least one cutout via a sealing rubber layer interposed therebetween.

4. A fluid-filled cylindrical elastic mount according to claim 1, wherein said at least one cutout over which said orifice member extends has a circumferential length which is not smaller than one-third of said circumference of said intermediate sleeve member.

5. A fluid-filled cylindrical elastic mount according to claim 1, wherein said plurality of fluid chambers includes a pressure receiving chamber partially defined by said elastic body and being adapted to undergo pressure changes upon application of a vibrational load to said mount, and an equilibrium chamber being diametrically opposite to said pressure receiving chamber and partially defined by a flexible diaphragm, said equilibrium chamber having a volume which is variable due to deformation of said flexible diaphragms said orifice member disposed in said at least one cutout through which said pressure receiving chamber is open in the outer circumferential surface of aid intermediate sleeve member.

6. A fluid-filled cylindrical elastic mount according to claim 1, wherein said orifice member is an arcuate plate member which extends in a circumferential direction of the intermediate sleeve member and has a pair of axial protrusions formed in a circumferentially intermediate portion thereof so to protrude outwardly from axially Opposite end faces thereof, in axially opposite directions, said pair of axial protrusions having an protruding end faces which are held in abutting contact with circumferentially intermediate portions of said axially opposite edges of said at least one cutout, respectively, and said orifice member being spaced apart from said axially opposite edges of said at least one cutout in said axial direction thereof, in circumferentially opposite end portions of said at least one cutout, to thereby provide at each of said circumferentially opposite end portions of said at least one cutout, two openings which are spaced apart from each other in said axial direction of said orifice member with said orifice member interposed therebetween of said at least one cutout, through which openings the corresponding pocket is open in said outer circumferential surface of said intermediate sleeve member.

7. A fluid-filled cylindrical elastic mount according to claim 1, wherein said orifice member includes a stop portion formed as an integral part thereof, said stop portion extending from an inner surface of said orifice member into one of said fluid chambers through a central portion of said at least one cutout, so as to be opposed to said center shaft member in said diametric direction with a predetermined amount of radial spacing therebetween.

8. A fluid-filled cylindrical elastic mount according to claim 1, wherein said intermediate sleeve member further includes a pair of stepped portions formed in said circumferential groove thereof, said pair of stepped portions being adapted to be held in abutting contact with said circumferential opposite end portions of said orifice member, respectively, so that said orifice member are circumferentially positioned relative to said intermediate sleeve member.

9. A fluid filled cylindrical elastic mount according to claim 1, wherein said plurality of cutouts include a first cutout extending in a circumferential direction of said intermediate sleeve member with a circumferential length which is slightly smaller than a half of a circumference of said intermediate sleeve member, and a pair of second cutouts opposed to said first cutout in a substantially diametric direction of said mount and being spaced apart from each other in said circumferential direction of said intermediate sleeve member, each of said pair of second cutouts having a circumferential length which is slightly smaller than a quarter of said circumference of said intermediate sleeve member, said plurality of pockets includes a first pocket open in said outer circumferential surface of said intermediate portion through said first cutout, and a pair of second pockets being opposed to said first pocket in said substantially diametric direction of said mount and being open in said outer circumferential surface of said intermediate sleeve member through said pair of second cutouts, respectively, said elastic body further includes an axial void formed therethrough so as to extend in an axial direction thereof, said axial void being located between said inner sleeve member and bottom walls of said pair of second pockets so that said bottom walls of said pair of second pockets provides a pair of thin-walled flexible diaphragms which are easily deformable, said first cutout and said pair of second cutouts being fluid tightly closed by said outer sleeve member to thereby provide a pressure receiving chamber partially defined said first pocket arid adapted to undergo pressure changes upon application of a vibrational load to the mount and an equilibrium chamber partially defined by said flexible diaphragms and having a volume that is variable due to deformation of said flexible diaphragms, and said orifice member having a semi-cylindrical shape which is disposed in said first cutout so as to extend over said circumferential length of said first cutout, and which is supported by said intermediate sleeve member such that said circumferentially opposite end portions of said orifice member being fitted in circumferential portions of said circumferential groove which portions located the sides of circumferentially opposite edges of said first cutout.

10. A fluid-filled cylindrical elastic mount according to claim 1, further comprising sealing rubber layers which are formed over and bonded to outer circumferential surfaces of said orifice member and said intermediate sleeve member, such that an inner circumferential surface of said outer sleeve member being fitted on said outer circumferential surfaces of said orifice member and said intermediate sleeve member via said sealing rubber layers.

11. A method of producing a fluid-filled cylindrical elastic mount comprising:

a center shaft member;

an intermediate sleeve member disposed radially outwardly of said center shaft member, said intermediate sleeve member having a plurality of cutouts formed therethrough, and having a circumferential groove formed in an axially intermediate portion thereof and being open in an outer circumferential surface thereof;

an elastic body interposed between said center shaft member and said intermediate sleeve member and having a plurality of pockets formed at respective circumferential positions thereof, said plurality of pockets being open in an outer circumferential surface of said intermediate sleeve member through said plurality of cutouts, respectively;

an outer sleeve member fitted on said intermediate sleeve member so as to close said plurality of cutouts and cooperating with said plurality of pockets to define a plurality of fluid chambers which are filled with a non-compressible fluid; and an orifice member for defining an orifice passage for fluid communication between said plurality of fluid chambers, said orifice member being disposed in at least one of said plurality of cutouts so as to extend over an entire circumferential length of said at least one cutout, and being supported by said intermediate sleeve member such that circumferential opposite end portions of said orifice member are fitted in said circumferential groove on the sides of circumferentially opposite edges of said at least one cutout, respectively, while having an orifice groove which is formed and open in an outer circumferential surface of said orifice member, which is fluid-tightly closed by said outer sleeve member to thereby provide said orifice passage, said orifice member having an axial length which varies in the circumferential direction thereof such that said orifice member is held in abutting contact with axially opposite edges of said at least one cutout in a circumferentially intermediate portion of said at least one cutout and that said orifice member is spaced apart from at least one of said axially opposite edges of said at least one cutout in said axial direction thereof in at least one of circumferentially opposite end portions of said at least one cutout so as to provide an opening through which a corresponding pocket is open in said outer circumferential surface of said intermediate sleeve member, the method comprising the steps of:

assembling said orifice member in an intermediate integral vulcanized product in which said shaft member and said intermediate sleeve member being elastically connected with each other by said elastic body interposed therebetween; and press-fitting said integral vulcanized product in a bore of said outer sleeve member within a mass of a non-compressible fluid.

12. A method of producing a fluid-filled cylindrical elastic mount according to claim 11, further comprising the step of rotating and/or inclining said intermediate integral vulcanized product within said mass of said non-compressible fluid before press-fitting said integral vulcanized product in said bore of said outer sleeve member, in order to eliminate air from said plurality of pockets.

* * * * *